US 8,452,726 B2

(12) United States Patent
Kuruganti et al.

(10) Patent No.: US 8,452,726 B2
(45) Date of Patent: May 28, 2013

(54) SHARING INFORMATION BETWEEN TENANTS OF A MULTI-TENANT DATABASE

(75) Inventors: Aditya S. Kuruganti, San Francisco, CA (US); Simon Z. Fell, San Francisco, CA (US); Jayaprakash Pasala, San Mateo, CA (US); Samatha Sanikommu, Dublin, CA (US); Kedar Doshi, Palo Alto, CA (US); Sanjaya Lai, South San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 218 days.

(21) Appl. No.: 12/885,266

(22) Filed: Sep. 17, 2010

(65) Prior Publication Data

US 2011/0302133 A1    Dec. 8, 2011

Related U.S. Application Data

(60) Provisional application No. 61/351,642, filed on Jun. 4, 2010.

(51) Int. Cl.
*G06F 17/00*        (2006.01)
*G06F 17/30*        (2006.01)
(52) U.S. Cl.
CPC ................................ *G06F 17/30017* (2013.01)
USPC ............................ 707/608; 707/770; 707/827
(58) Field of Classification Search
USPC ................. 707/608, 769, 770, 827; 709/203, 709/217, 219
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |

(Continued)

OTHER PUBLICATIONS

Weissman et al., The design of the force.com multitenant internet application development platform, 2009, ACM, 889-896.*

*Primary Examiner* — Jean B Fleurantin
(74) *Attorney, Agent, or Firm* — Ingrassia Fisher & Lorenz, P.C.

(57) ABSTRACT

In a method, system, and computer-readable medium having instructions for sharing information between tenants of a multi-tenant database, information is received on a connection between a first tenant of a multi-tenant database and a second tenant and the connection has information on a scope of data from the first tenant shared with the second tenant, data is allowed for a record of the first tenant to be accessible to the second tenant in accordance with the connection, information is received on a file related to the record of the first tenant, and data is allowed from the file to be accessible to the second tenant in accordance with the connection.

17 Claims, 8 Drawing Sheets

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 7,779,039 B2 * | 8/2010 | Weissman et al. ............ 707/793 |
| 7,814,052 B2 * | 10/2010 | Bezar et al. .................. 707/610 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,122,040 B2 * | 2/2012 | Banister et al. .............. 707/759 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 * | 10/2005 | Weissman et al. ............ 707/102 |
| 2005/0283478 A1 * | 12/2005 | Choi et al. ..................... 707/9 |
| 2006/0235715 A1 * | 10/2006 | Abrams et al. ................ 705/1 |
| 2009/0030906 A1 * | 1/2009 | Doshi et al. ................... 707/9 |
| 2009/0063504 A1 * | 3/2009 | Banister et al. ............... 707/10 |
| 2011/0258603 A1 * | 10/2011 | Wisnovsky et al. ........... 717/125 |
| 2012/0089550 A1 * | 4/2012 | Arora et al. ................... 706/47 |

* cited by examiner

500

Case Comment Edit / 502

[ Save ]  [ Cancel ]  [ Spell Check ]

Private [☑]

Case Description: Widgets Not Delivered

Case Comment: [                    ]

[ Forward Case/Manage Connections ]     [ Add Note or Attachment ]

<u>Record</u>                                              <u>Action</u>

Case Comment: 1-0001 Widget Order Correction -- Shared with Connection1 [Stop Sharing]

Case: 1 Widgets                          -- Shared with Connection1 [Stop Sharing]

FIG. 5A

Case Assignment/Acceptance

Owner 504

○  [ Contact ▽ ]  [ John Doe ]

[ ]  Send Notification Email

○  Assign using assignment rule

Related To 506

Reports To [            ]      Asset   [            ]

Contact    [            ]      Account [            ]

FIG. 5B

| Forward Cases to Connections | | | |
|---|---|---|---|
| Case Number | Contact Name | Subject | Status |
| ☐ Case 1 | Contact Name 1 | Subject 1 | New |
| ☐ Case 2 | Contact Name 2 | Subject 2 | New |

FIG. 5C

| Accept Connections | | | |
|---|---|---|---|
| Connection Name | Contact Name | Subject | Status |
| ☐ Connection 1 | Contact Name 1 | Subject 1 | New |
| ☐ Connection 2 | Contact Name 2 | Subject 2 | New |

FIG. 5D

SHARING INFORMATION BETWEEN TENANTS OF A MULTI-TENANT DATABASE

CROSS REFERENCE TO RELATED PATENTS

This application claims the benefit of U.S. Provisional Patent Application 61/351,642 entitled "METHODS AND SYSTEMS FOR SHARING INFORMATION BETWEEN TENANTS OF A MULTI-TENANT DATABASE ENVIRONMENT," filed Jun. 4, 2010, Kuruganti et al., the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to sharing information in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure retrieval of accurate information and subsequent delivery of this information to the user system has been and continues to be a goal of administrators of database systems.

Unfortunately, conventional database approaches might limit retrieval of information from the database system to users that have authorization to access data in the particular database system. Conventional database systems do not provide a mechanism for sharing data in a particular database system to users that do not have authorization for the particular database system. Accordingly, it is desirable to provide techniques enabling secure sharing of information from the database system of the database system.

BRIEF SUMMARY

In accordance with embodiments, there are provided mechanisms and methods for sharing information between tenants in a multi-tenant database system.

In an embodiment and by way of example, a method for sharing information between tenants in a multi-tenant database system is provided. In a method, system, and computer-readable medium having instructions for sharing information between tenants of a multi-tenant database, information is received on a connection between a first tenant of a multi-tenant database and a second tenant and the connection has information on a scope of data from the first tenant shared with the second tenant, data is allowed for a record of the first tenant to be accessible to the second tenant in accordance with the connection, information is received on a file related to the record of the first tenant, and data is allowed from the file to be accessible to the second tenant in accordance with the connection.

While one or more implementations and techniques are described with reference to an embodiment in which sharing information between tenants in a multi-tenant database system environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 5A illustrates an example of a user interface for sharing information between tenants in a multi-tenant database system.

FIG. 5B illustrates an example of a user interface for sharing information between tenants in a multi-tenant database system.

FIG. 5C illustrates an example of a user interface for sharing information between tenants in a multi-tenant database system.

FIG. 5D illustrates an example of a user interface for sharing information between tenants in a multi-tenant database system.

DETAILED DESCRIPTION

General Overview

Systems, computer readable mediums, and methods are provided for sharing information between tenants in a multi-tenant database. Tenant data, typically, is arranged in a multi-tenant database such that data of one tenant is kept logically separate from that of other tenants so one tenant does not have access to another tenant's data, unless such data is expressly shared. It may be desirable for one or more tenants of a multi-tenant database to share data or information with other tenants and/or one or more users of another database system. In one or more embodiments, users of a first tenant can specify the data to be shared with one or more users at a second tenant in a multi-tenant database.

The tenant may have a connection with one or more other tenants that serves a contract to allow sharing of information or data between tenants. The connection may indicate the scope of the data shared between one or more users of a first and a second tenant. Tenants and/or users of a multi-tenant database system may expressly give permission to share data with users of another tenant. For example, a user of a first tenant database system may give permission to provide a set of related data to one or more users for other tenants in a multi-tenant database system. In another example, a user of a first tenant may specify to share a record with a user of a second tenant, and all related data to the shared record. Continuing with the example, the parent and child records of the shared record of the first tenant may be shared with the second tenant.

Data related or associated with a shared record may be shared between tenants of a multi-tenant database system. In one or more embodiments, a file from a first tenant may be securely shared with a second tenant. The file may be associated with a shared record for a first tenant and the file may be shared with the second tenant in accordance with the connection between the first and second tenant.

As used herein, the term multi-tenant database system refers to those systems in which various elements of hardware and software of the database system may be shared by one or more customers/tenants. For example, a given application server may simultaneously process requests for a great number of customers/tenants, and a given database table may store rows for a potentially much greater number of customers.

Next, systems, computer readable mediums with instructions, and methods for sharing information between tenants in a multi-tenant database will be described with reference to example embodiments. In the following examples, one or more implementations are illustrated for optimizing queries. Clearly, in alternate implementations, the illustrated processes and process steps may be combined into fewer steps, divided into more steps, and/or performed in a different sequence.

Figure 1:
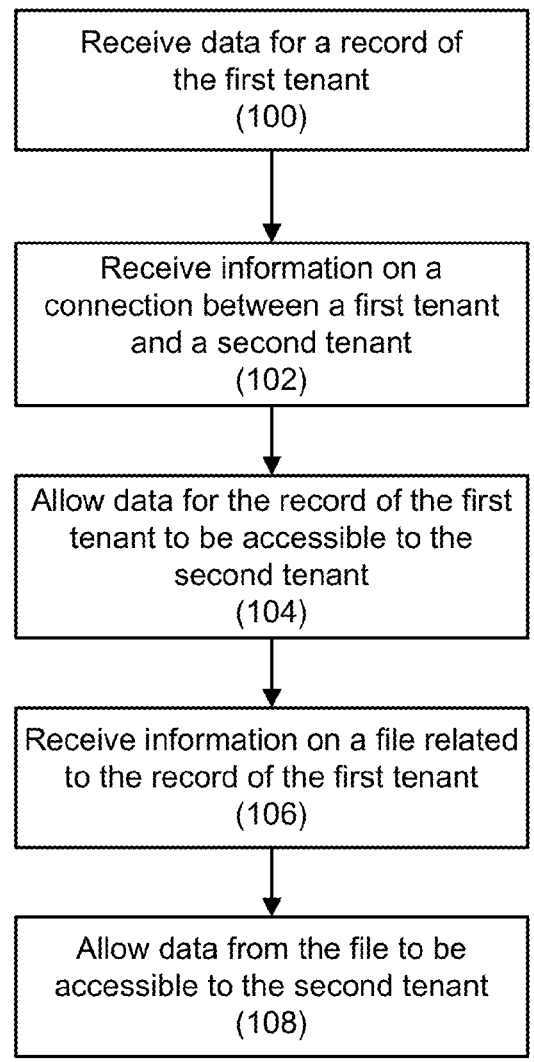
FIG. 1 illustrates an example of a simplified flow diagram for sharing information between tenants in a multi-tenant database system.

FIG. 1 illustrates an example of a simplified flow diagram for sharing information between tenants in a multi-tenant database system. Data may be received for a record of the first tenant (100). The data may be received by the database system from a user using an Application Programming Interface (API), a graphical user interface, a SQL query, and/or any other user interface for software. The data may be received for a record of a database table for a tenant in a multi-tenant database. In a preferred embodiment, data may be received for records for entry in database tables for entities used with Customer Relationship Management (CRM) software, including, but not limited to, Cases, Contacts, Accounts, Opportunities, Tasks, Activities, Notes, Attachments, Comments, Custom tenant entities, and/or any other database entities.

The tenant may have data stored in a multi-tenant database that is logically separate from other tenants of the multi-tenant database. In a preferred embodiment, a tenant may have a tenant id number (e.g. a key) to identify the tenant data for retrieval and entry into the multi-tenant database. For example, a record for a tenant (e.g. a Case, a Note, etc.) may have a tenant id associated with the record to indicate that the record is for a tenant of multi-tenant database system.

Upon entry of the received data, a check may be performed to determine whether the received data may be shared with one or more tenants. For example, a check may be performed by accessing one or more database tables to determine if a record of a first tenant is shared with a second tenant. Continuing with the example, a shared record may have attribute (e.g. a column in the database table for the record) that indicates the record may be shared with other tenants.

In an embodiment, the sharing of data may be perceived as a push technology. For example, upon receipt of the new data, the server may push the data to the second tenant. In another embodiment, the sharing of data may be perceived as pull technology and the server may await a specific request to send data to a second tenant. For example, the second tenant may request the new data for the first tenant from the server.

In one or more embodiments, a trigger may be used to perform a check upon entry of the data in a database table. The trigger may be a database trigger with functionality provided by a database implementation and/or the trigger may be a method/function provided by the tenant and/or the on-demand database service. A trigger may cause a check to be performed to determine whether one or more tenants have a connection (e.g. an agreement to share data) upon entry of data to a database table.

Information may be received on a connection between a first tenant and a second tenant (102). The connection may indicate whether the received data may be shared with a second tenant. The connection may indicate the scope of the data shared with the second tenant, including, but not limited to, the hierarchical relationships to shared data (e.g. a shared record) that are permitted to be shared and the public records related to the shared record. For example, the connection may provide that entry of a Case record should cause at least a portion of related records to the Case (e.g. Account, Notes, Attachments, other Cases, Comments, etc) to be shared with the second tenant, and other related records, such as Opportunities and Leads may not be shared. Continuing with the example, a Case record may indicate a problem with a particular product, and related Cases and Comments to the Case record may indicate the status of the handling of the problem by a reseller (e.g. a first tenant) and a supplier (e.g. a second tenant).

In another example, the Case record may have related public Case records from a third tenant that may be shared with the second tenant. Continuing with the example, the Case record may indicate a particular problem with an Account and/or a Product that may be shared among one or more tenants.

The connection may be established after notification to both tenants and authentication that the notification on desire to connect/accept a connection came from the respective tenants. The connection may be managed to specify the tenants that share data and the scope of the shared data. An implementation of a connection is described in U.S. patent application Ser. No. 12/145,325, entitled "Sharing Data Between Subscribers of a Multi-Tenant Database Service," filed on Jun. 24, 2008, which is incorporated herein by reference, and U.S. patent application Ser. No. 12/437,459, entitled "Sharing Tenant Information Utilizing a Multi-Tenant On-Demand Database Service," filed on May 7, 2009, which is incorporated herein by reference.

Data for the record of the first tenant may be allowed to be accessible to the second tenant (104). The data for the record of the first tenant may be sent to the second tenant in accordance with the connection. For example, the received data for the record may be sent to the second tenant for entry into a record for a database table for the second tenant. A new record for a table at the second tenant may be created and/or an existing record of the second tenant may be used for the received data.

In a preferred embodiment, the received data, designated as data to share in accordance with the connection for the tenants, may be placed in a queue for processing by a process that executes in the background for the on-demand multi-tenant database service. In one or more embodiments, the queue may be implemented as a table with fleeting records, a list, and/or any other data structure. A notification may be placed on the queue with the received data, a record for the second, and/or any other type of method for communicating to share the received data.

Information may be received on a file related to the record of the first tenant (106). The received data may be a file attachment and/or data for a record associated with a file attachment. For example, the received data may be for a Case that has an attribute with a file name and file path for an attachment at the first tenant. In another example, the Case may have a related Comment (e.g. a child record of a Case record, a Comment of a parent Case record to the Case, etc.) with a file attachment.

In another example, the filepath/filename may be an attribute/column value for a related record to the record with the shared data. Continuing with the example, the file may be a file with a history of correspondence between a reseller and a customer, and the file may be shared when the Case involving the customer is shared with another tenant. The record that may be shared between tenants may have columns that indicate the related records and/or files.

The connection may indicate if the file may be shared with the second tenant. For example, the attachment file may be viewed as a child record to a Case (e.g. a shared record) and the connection for the Case record may indicate that all related records to the Case may be shared with the second tenant. In another example, the connection may specify if file attachments may be shared between tenants for the connection.

The data from the file may be allowed to be accessible to the second tenant (108). The data from the file may be made accessible to the second tenant with the following implementations, including, but not limited to, providing a filepath/filename, copying the contents of the file to a record, providing a resource locator for accessing the file, sending a notification with the file to one or more users, and/or any other method for sharing the file with a second tenant. In one or more embodiments, a record with the contents of the file may be placed on a queue for processing by a background process for the on-demand multi-tenant database service. Continuing with the example, the new record with the contents of the file may be sent to the second tenant by the background process to be entered in to the database for the second tenant. The data from the file may be copied to a record for entry into a database table at the second tenant. The file may be cleaned or stripped of any harmful code before being sent to the second tenant. In another embodiment, the uniform resource locator (URL) may be provided to the second tenant to access the file as a column value in a database table.

In an embodiment, the file may provide information on one or more records in a database table for the first tenant. For example, the file that is shared may be a WSDL file describing database tables and shared columns of database tables of a first tenant that may be shared with a second tenant, and the WSDL may be used to replicate a hierarchy at the first tenant for the shared records at the second tenant. In another example, the file may provide the hierarchical relationship for related records at the first tenant and/or mapping information between the tenants.

In one or more embodiments, a user of the second tenant may specify whether to accept the record with the file attachment. For example, the user of the second tenant may indicate that all shared records and file attachments may be entered automatically in the database for the second tenant in a similar hierarchical structure to the first tenant. The user of the second tenant may specify exactly how the shared records and attachments may map to the database tables of the second tenant. In another embodiment, the user of the second tenant may assign their own assignment rules and/or determine where the shared record and/or file attachment may fit into their database system upon acceptance of the shared record and/or file attachment.

Figure 2A:
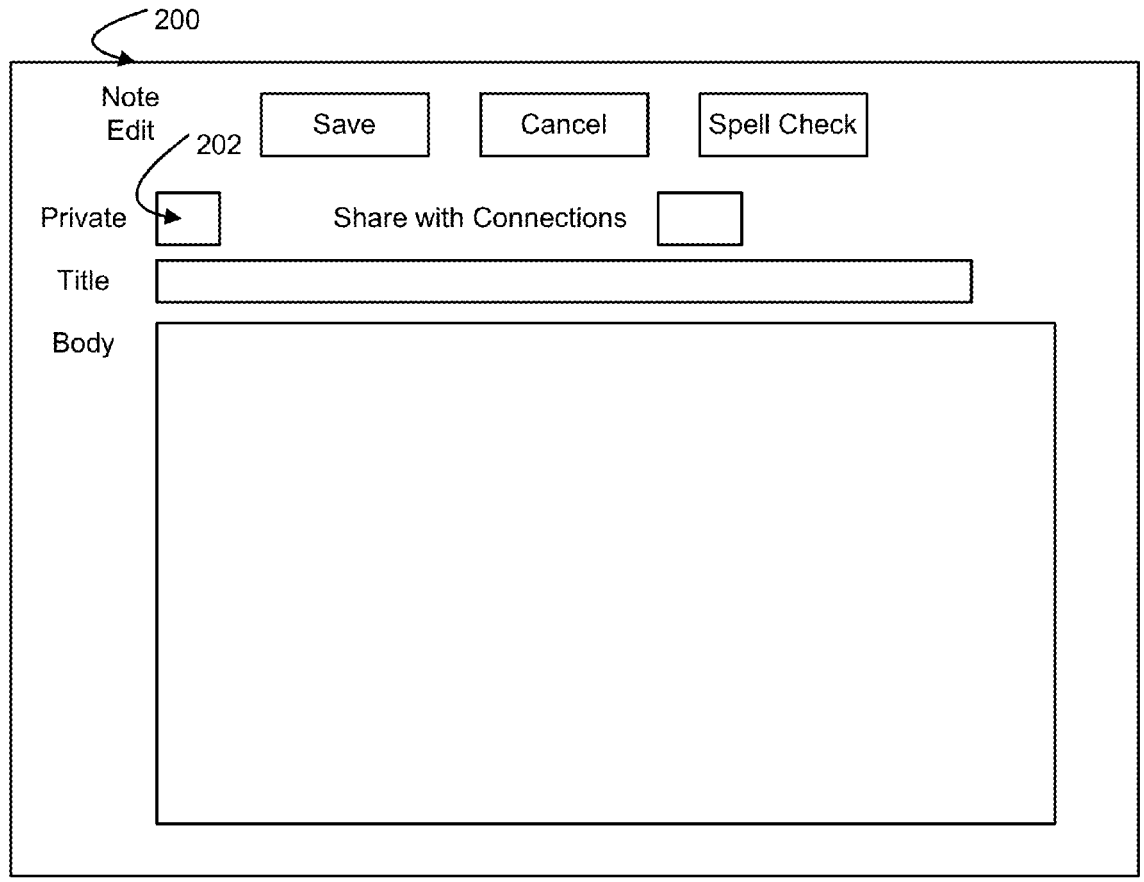
FIG. 2A illustrates an example of a user interface for sharing information between tenants in a multi-tenant database system.

FIG. 2A illustrates an example of a user interface for sharing information between tenants in a multi-tenant database system. FIG. 2A provides a user interface for a Note record of a first tenant that may be shared with a second tenant. The example of the user interface in FIG. 2A provides an interface for editing the Note 200 record. The user interface provides the ability to 'Save' the record in the database, 'Cancel' editing the record, 'Spell Check' for the record, indicate whether the record is 'Private' 202, enter a 'Title' for the Note record, and enter the 'Body' contents of the Note. One or more of the fields for the Note may be published to a record of the second tenant if the record is designated to be shared between the first and second tenant in accordance with the connection between the tenants.

In a preferred embodiment, the Notes may be child records of other records, including, but not limited to, Leads, Opportunities, Accounts, Contacts, Products, Cases, and Custom entities for a tenant. By designating the Note as 'Private' 202, the Note may not be shared with the second tenant even though the connection between the tenants may indicate that Notes may be shared. One or more attributes of the Note record at the first tenant may not be shared and/or accessible to the second tenant. In an embodiment, a Note may be designated to 'Share with Connections' with the user interface, and the Note may then be shared with a tenant in accordance with the connection for the first and second tenant.

In one or more embodiments, the user may need to explicitly indicate that the record may be shared with the second tenant. For example, a parent record of the Note record may be shared with the second tenant, but the Note record may have an attribute that indicates the record may not be shared with connections and the Note may not be shared. In a preferred embodiment, Notes may be shared with a second tenant when the parent record is shared, Notes are designated to be shared for the connection, and the Note is not private.

Figure 2B:
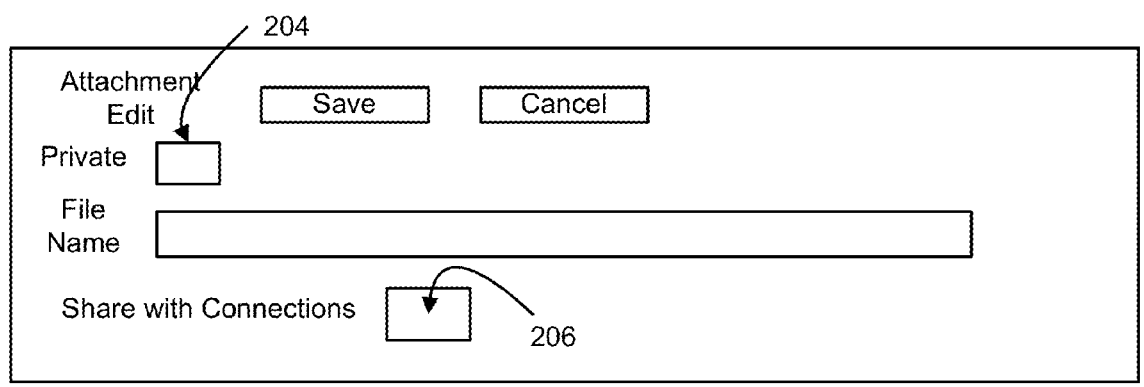
FIG. 2B illustrates an example of a user interface for sharing information between tenants in a multi-tenant database system.

FIG. 2B illustrates an example of a user interface for sharing information between tenants in a multi-tenant database system. FIG. 2B provides a user interface for an Attachment record of a first tenant that may be shared with a second tenant. The example of the user interface in FIG. 2B provides an interface for editing the Attachment record. The user interface provides the ability to 'Save' the record in the database, 'Cancel' editing the record, indicate whether the record is 'Private' 204, enter a 'File Name' for the Attachment record, and enter the 'FileName' for the Attachment, and indicate whether to 'Share with Connections' 206. For example, if the Attachment is marked 'Private' 204 with the user interface, then the Attachment may not be shared even if a parent record is shared. Continuing with the example, if the Attachment record is marked to 'Share with Connections' and the Attachment record is not marked private, then the Attachment may be shared with a second tenant.

In a preferred embodiment, the Attachment is shared as a child record when the parent record is shared. The 'File Name' may associate a file name and a file path (e.g. an attribute or field in an Attachment record) with the Attachment record. In one or more embodiments, the file contents are shared with the second tenant and the filename/file path at the first tenant may not be shared with the second tenant. In another embodiment, the filename/file path may be a URL and publicly accessible so the filename/file path attribute of a shared record may be shared with the second tenant.

Figure 3:
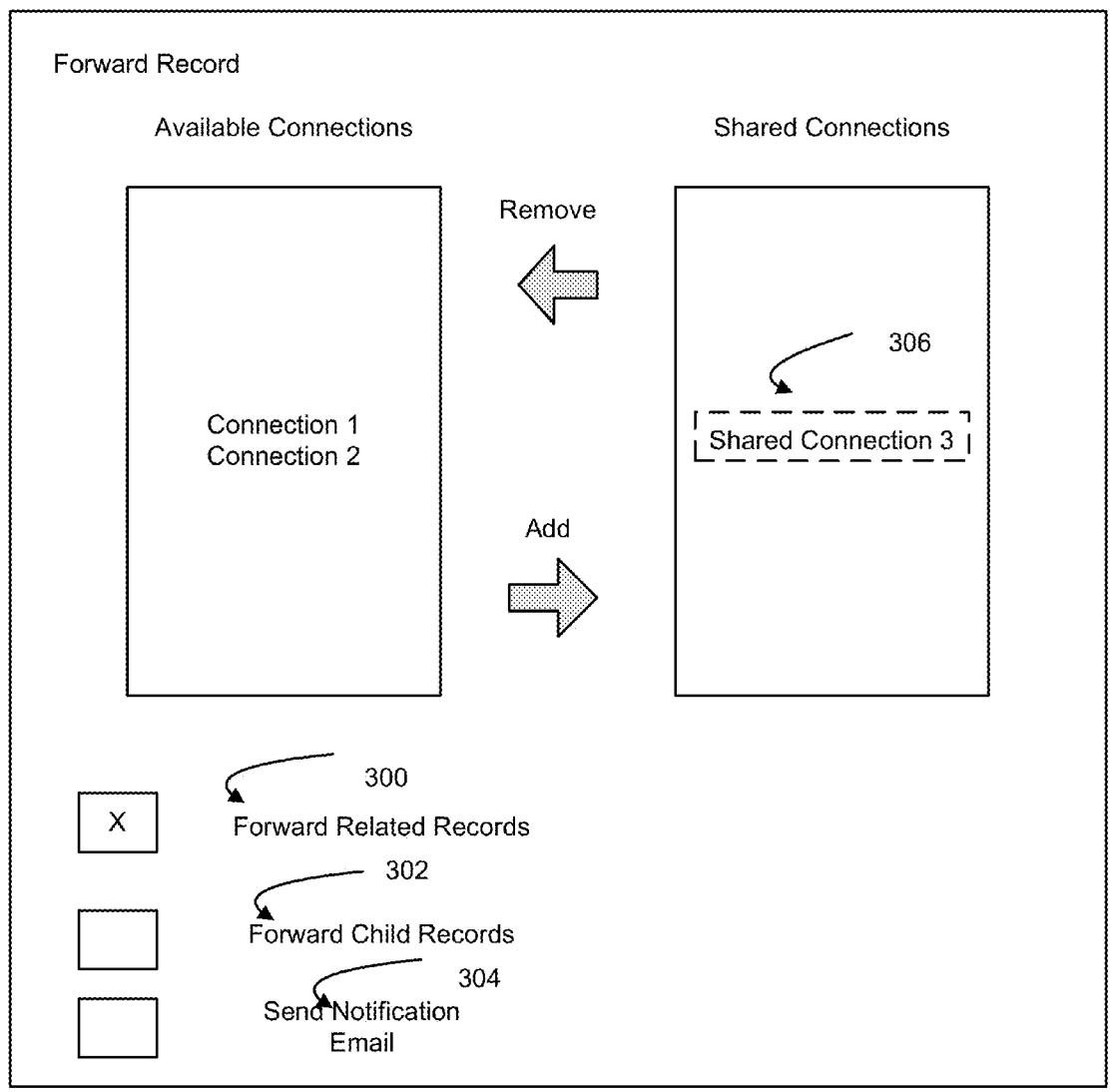
FIG. 3 illustrates an example of a user interface for establishing a connection between tenants for sharing information between tenants in a multi-tenant database system.

FIG. 3 illustrates an example of a user interface for establishing a connection between tenants for sharing information between tenants in a multi-tenant database system. FIG. 3 provides a user interface for managing connections between a first tenant and a second tenant. The example of the user interface in FIG. 3 provides an interface for editing connections and sharing connections for a record. In FIG. 3, the related records for a record and a connection may be forwarded by selecting 'Forward Related Records' 300, the child records for a connection may be forwarded by selecting 'Forward Child Records' 302, and email notifications to record owners and/or tenants may be selected with 'Send Notification Email' 304. For example, 'Shared Connection 3' 306 is a connection between one or more tenants and 'Forward Related Records' 300 has been selected for the connection. Continuing with the example, if an Account record is shared with Connection 3, then a Case may be forwarded for 'Shared Connection 3' as a child record of the Account record for the first tenant and shared with the second tenant, and a Case record that is a parent record of the shared Case record may be shared with the second tenant.

In another example, a user for a first tenant may select 'Forward Child Records' and the child record for the shared record may be shared. For example, if a Case record is shared then the child records for the Case (e.g. Comments, other Cases, etc.) may be shared but the parent record to the Case (e.g. Account) may not be shared.

A user may specify whether to 'Send Email Notifications' 304. For example, an email notification may be sent to users of a first tenant and/or users of a second tenant to indicate that a record is shared and/or going to be shared. In an embodiment, the email notification may allow the user to decide whether to proceed with sharing a record and/or related records to a shared record.

Figure 4:
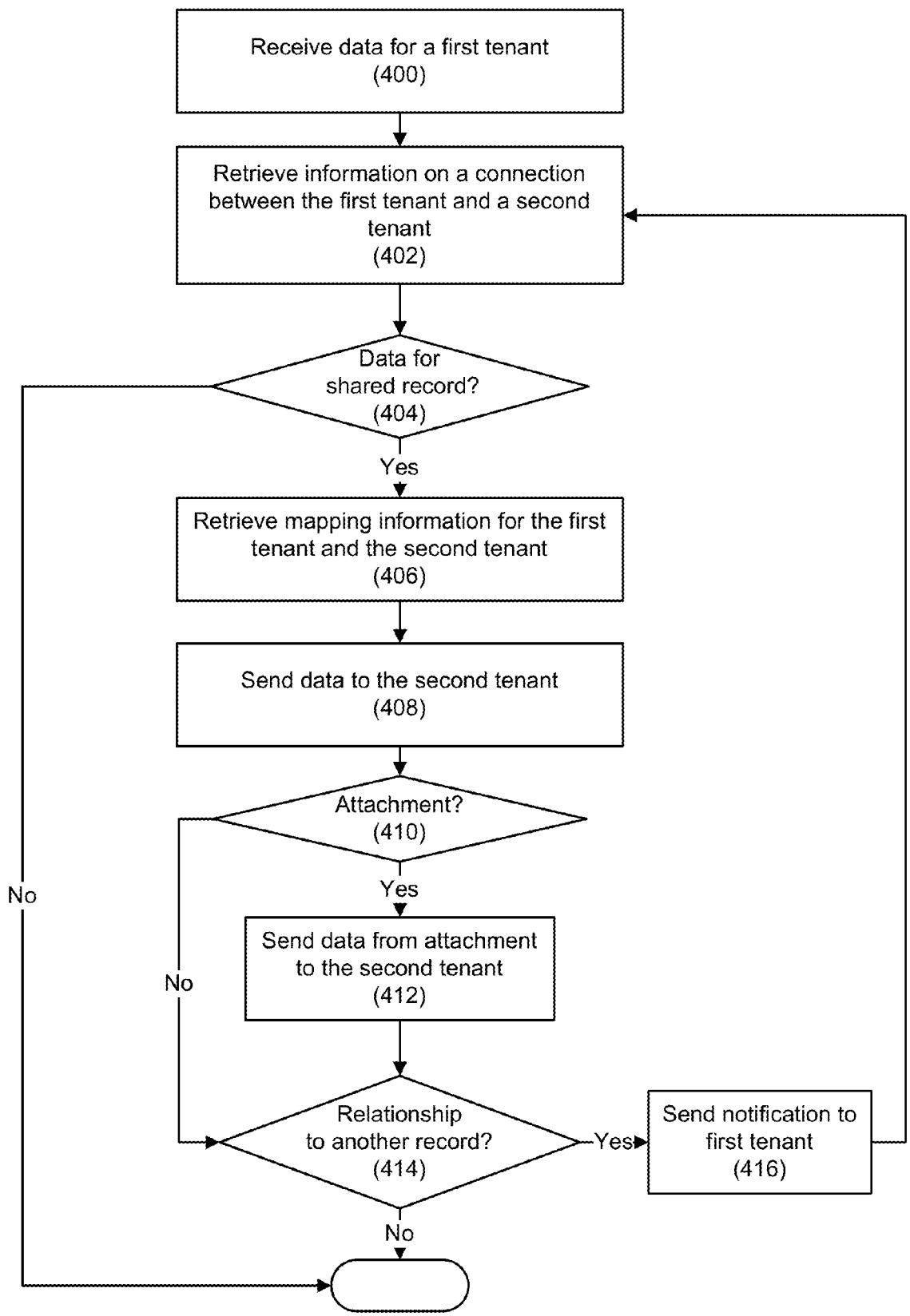
FIG. 4 illustrates an example of flow diagram for sharing information between tenants in a multi-tenant database system.

FIG. 4 illustrates an example of flow diagram for sharing information between tenants in a multi-tenant database system. Data may be received for a first tenant (400). Data for a first tenant of a multi-tenant database system may be entered using a user interface, a database request, and/or any other method for sending data to a database system. The data may be received for entry of a new record or entry of data into an existing record of a database table for a first tenant in the database system. In a preferred embodiment, the records may be entered in database tables for CRM entities, including, but not limited to, Cases, Contacts, Accounts, Opportunities, Tasks, Activities, Notes, Attachments, Comments, Custom entities, and/or any other database entities. The records may be related and have hierarchical relationships between them. For example, a Case record may be a parent records for a Comment record, and the Case record may be a child of an Account or another Case record.

In one or more embodiments, the data received may be a file and/or information on a file location associated with a record. The file may be associated with a record as an attribute of the record (e.g. a file name as an attribute) and/or the contents of the file may be inserted into a related record to the record (e.g. a text field of a child record).

In another embodiment, the data received may be for a record that is associated with a file (e.g. a record related to an Attachment, a record related to a record with a file). The record associated with the file attachment may be shared, and the file attachment may be shared with the second tenant in accordance with the connection between the tenants.

Information may be retrieved on a connection between the first tenant and a second tenant (402). A connection and/or agreement may be reached between tenants in a multi-tenant database system to share at least a portion of data from the first tenant. The connection may be established by sending a notification requesting to share and receiving a response that permits sharing of data between the tenants. The user sending the notification and the user sending the response regarding establishing a connection between the tenants may be authenticated before data is shared between the tenants. An implementation of a connection is described in U.S. patent application Ser. No. 12/145,325, entitled "Sharing Data Between Subscribers of a Multi-Tenant Database Service," filed on Jun. 24, 2008, which is incorporated herein by reference, and U.S. patent application Ser. No. 12/437,459, entitled "Sharing Tenant Information Utilizing a Multi-Tenant On-Demand Database Service," filed on May 7, 2009, which is incorporated herein by reference. The connection may be viewed as a metadata contractual agreement between the tenants.

A determination may be made as to whether the data entered involves a shared record (404). The tenants may specify the shared data that may be replicated and synchronized between the tenants with the connection. For example, a first tenant may specify that all data related to a particular Account record may be shared between the tenants. In another example, the first tenant may indicate that a Case record and all related records (e.g. child and parent records) for the case may be shared with the second tenant. The first tenant may share all records and/or a portion of one or more records for the first tenant.

In an embodiment, a user may utilize a user interface such as illustrated in FIG. 3 to associate a connection with a record. By associating the record with a connection, the record may be a shared record between the tenants. As illustrated in FIG. 3, the scope of sharing for a particular shared record and related records of the shared may be specified for the connection between the tenants on a record basis. Those skilled in the art will recognize that the scope of sharing may be applied for one or more shared records with the interface illustrated in FIG. 3 and/or a similar interface.

The entry of the data into the database by a tenant may trigger sharing of the data with another tenant. For example, a trigger may be written to ensure that the data is replicated and/or synchronized for another tenant. An example of pseudocode for a trigger is, as follows:

```
trigger MY_CUSTOM_TRIGGER ON CASE (after insert) {
    for( Integer i=0; i < Trigger.size; i++) {
        Case myNewCase = Trigger.new[i];
        if (... <some condition is met>...) {
            PartnerNetworkRecordConnection newrecord = new
        PartnerNetworkRecordConnection( );
            newrecord.ConnectionId = <hard coded connection id>
            newrecord.LocalRecordId = myNewCase.id;
            newrecord.RelatedRecords = 'Case';
            insert newrecord; // This will share my newly created
        cases with other org.
        }
    }
}
```

In the example of the pseudocode for a trigger, upon entry of new data to a shared record in the database for a first tenant, a new record may be created in accordance with the connection between the tenants. The new record may have an id for the connection (e.g. newrecord.ConnectionId), the first tenant record id (newrecord.LocalRecordId), and indicate an entity type for the record (e.g. newrecord.RelatedRecords='Case'). The "newrecord" in the example may be a Case entity type. In a preferred embodiment, a Case entity type may be available as both a parent and/or a child record for related records. For example, an Account record may have a child Case record and the Case record may itself have a child Case record.

If the data entered does not involve shared data in accordance with the connection (404), then the entered data may not be shared. Alternatively, if the data does involve shared data (404), then mapping information for the first tenant and second tenant may be retrieved (406).

Continuing with FIG. 4, the attributes/columns of the shared record of a first tenant may be mapped to columns for a record at the second tenant (406). A mapping table may be used to map the columns of a record for the first tenant to columns of a record for the second tenant. For example, the second tenant record that is shared with the first tenant record may have a column with a foreign key for the corresponding first tenant record. In another example, the first tenant may have a column that is a varchar that is a different size than the respective column of the shared record in the second tenant database, and the mapping table may keep information on the different types and sizes of the columns for the tenants to ensure that the information is replicated and synchronized properly.

The mapping table may be used as a guide for creating new records and/or adding to existing records at the second tenant to replicate the data. For example, the mapping table may be used to create a new shared record for the second tenant and the permitted shared information from the table for the shared record at the first tenant may be assigned to columns of a record for a table at the second tenant.

The data for the shared record may be sent to the second tenant (408). A new record or an existing record at the second tenant may be populated with the received data at the first tenant. In one or more embodiments, a notice of a request to replicate and/or synchronize the received data at the first tenant to the second tenant may be placed on a queue. A background process for the on-demand database service may process the notices on the queue nearly instantaneously after placement on the queue.

Embodiments of the notice may include, but are not limited to, an instance of a new record for the second tenant with the received data, a data structure with the received data, one or more keys for the first tenant record being replicated or synchronized and/or the second tenant record, and/or any other information to communicate the need to replicate and/or synchronize data. The queue may have implementations including, but not limited to, a table, a list, and/or any other data structure for processing notices to process the received data. In a preferred embodiment, the queue may be a table with fleeting records that are removed as the records for the replicated/synchronized data is processed.

Next, a determination is made as to whether the received data for the shared record includes a file attachment (410). For example, a file may be associated with the shared record with a file name and file path as an attribute/column value for the shared record. If there is no attachment associated with the shared record (410), then a determination may be made as to whether the shared record has a relationship to another record (414). Alternatively, if the shared record includes an attachment (410), then the data from the attachment may be sent to the second tenant (412).

The data from the attachment may be copied and placed in a record for the shared tenant. Similar to the data for the shared record, a notice may be placed on the queue for the data of the attachment to be replicated and/or synchronized at the second tenant. Alternatively, the file itself may be copied and shared with the second tenant.

The attachment associated with the record at the first tenant may be associated with a corresponding record at the second tenant. In a preferred embodiment, the contents of the file may be placed in a new record and the new record may associated with the shared record for the second tenant as a child record.

The connection for the tenants may indicate whether the shared data may be edited at both the first tenant and the second tenant after it has been shared. For example, the first tenant may retain write access rights to the shared records and may only permit the second tenant to read the shared data. Alternatively, the second tenant may be permitted to write to the shared data, and associate records to the shared data. For example, second tenant may be able to associate Notes and/or file attachments to a Case that is shared.

A determination may be made as to whether the shared data has related records (414). If there are no related records (414), then processing for the entered shared data may end. Alternatively, if there are related records (414), then a notification may be sent to the first tenant (416). The notification may be sent to the first tenant to request to share the related record and/or indicate that the related record is shared with the second tenant (416). Next, connection information for the first and second tenant may be retrieved (402). If the connection does not indicate that the related records may be shared, then a notification may be sent to the first tenant and/or the second tenant to allow for sharing of the related records for the shared data.

FIG. 5A illustrates an example of a user interface for sharing information between tenants in a multi-tenant database system. FIG. 5A provides a user interface for a Case/Comment record of a first tenant that may be shared with a second tenant. The example of the user interface in FIG. 5A provides an interface for editing the Case Comment 500 record. The user interface provides the ability to 'Save' the record in the database, 'Cancel' editing the record, 'Spell Check' for the record, indicate whether the record is 'Private' 502, enter a 'Case Description' for the Case record, and enter the 'Comment' for a Case.

In an embodiment, the history of sharing for a Case and the assignment of the Case to connections may be displayed on a user interface for each individual Case and/or Case/Comment user interface. For example, Case Comments (e.g. 1-0001 "Widget Order Correction" Comment) related to the Case (e.g. Case 1) may be displayed with the Case/Comment Entry interface and the status of the Case Comment (e.g. Shared with Connection 1) may be displayed. The Case/Comment user interface may allow for 'Stop Sharing' the Case and/or Case/Comments with a connection (e.g. "Connection 1") for the first tenant.

The Case/Comment user interface may allow a user to 'Forward Case' and individually assign a connection to a case to share the record. The user may be able to manage the connections for the particular case and assign the case to one or more connections for forwarding the case to a connection. In an embodiment, the connections may be managed for the Case with a user interface illustrated in FIG. 3B.

In an embodiment, a Note or Attachment may be associated with the Case. For example, a Note or Attachment may be assigned as related record to a Case (e.g. a child record of a Case). The user may use an interface as illustrated in FIGS. 2A and 2B to input a Note or Attachment for a related Case. The Note or Attachment from a first tenant may then be forward with a Case to a second tenant in accordance with a connection if the user selects to forward related records or child records of the Case.

FIG. 5B illustrates an example of a user interface for sharing information between tenants in a multi-tenant database system. In one or more embodiments, a user may elect to automatically accept shared records and related records of shared records. If the user chooses to automatically accept shared records, then a new record that replicates the shared record at the first tenant may be inserted into the database of the second tenant with a similar hierarchy as found at the first tenant.

In another embodiment, the second tenant may select to accept each record as it is received. FIG. 5B allows a user of the second tenant to assign relationships to other records, assign owners, and/or assign the forwarded shared record to a connection. FIG. 5B illustrates an example of assigning relationships 506 and owners 504 to Cases by the second tenant. When a second tenant prefers to accept each record individually, then the user may select how the record is related records at their database. For example, a Contact or any other user may be assigned as an owner of the Case. In another embodiment, a case may have an assignment rule that associates the case with a connection. The case may be forwarded to one or more tenants identified for a connection. Related records may be assigned to the Case, such as, but not limited to, Accounts, Contacts, Assets, and/or a user.

FIG. 5C illustrates an example of a user interface for sharing information between tenants in a multi-tenant database system. In an embodiment, the cases may be forwarded to connections 'en masse' as illustrated in FIG. 5C. As shown in FIG. 5C, 'Case 1' and 'Case 2' may be selected and forwarded to connections by selecting 'Forward Cases to Connections.' In an embodiment, 'Forward Cases to Connections' may allow a user to navigate to a user interface for connection management; an example is shown in FIG. 3, to select a connection for sharing the selected cases. The user may select a connection for one or more records using an interface similar to the interface illustrated in FIG. 5C.

FIG. 5D illustrates an example of a user interface for sharing information between tenants in a multi-tenant database system. FIG. 5D illustrates an example of allowing a user of a second tenant database to accept shared records and/or attachments from the first tenant. As shown in FIG. 5D, 'Connection 1' and 'Connection 2' may be selected and accepted by the user of the second tenant database with 'Accept Connections.' Upon acceptance, the shared records may be inserted into records for access by the second tenant. In an embodiment, mapping tables may be used to map attributes of shared records from the first tenant to attributes of shared records at the second tenant. The mapping tables may also indicate how records with the contents of file attachments may be inserted into tables at the second tenant database.

Although examples may be shown referencing specific records (e.g. Cases, Comments, etc.), those with skill in the art will recognize that the implementations illustrated in the examples may be used for any type of database record or data that is to be shared.

Cases and Comments

Case Management may provide the ability to share entity data types, such as Cases, Comments, Assets, and Attachments. An entity may be a table for any type of record or collection of data. A record may be designated as connected between a first tenant and a second tenant. A Case may be related to another record. Cases may be shared (e.g. forwarded) individually, in conjunction with other cases (e.g. en masse), and/or in conjunction with a related record (e.g. a child/parent or other hierarchical relationship with another record such as an Account, a Contact, a Product or any other type of entity record in which the case may be related). Optionally, an application programming interface (API) and/or user interface may include, but is not limited, publish fields, subscribe fields, templates, publish object/field selection, case history, indication of connections, a case number field (e.g. a field generated when the case is created), and/or a forwarding field. For example, a Case Number may be a read only field that may be generated when the case is created. Based on an API definition, an example of behavior for a Case Number field may be: (a) Publish Field: should be able to publish the Case Number, (b) Subscribe Field: cannot subscribe to Case Number (though the customer may map the connections Case Number to a Text field (>=80)), and/or (c) the Case Number may be an editable field.

Cases may be shared in ways including, but not limited to, when a case is a member of the parent record (e.g. Account/Contact), individually or en-masse using the 'Forward to Connections' link on the Case list view. When sharing a case, an email notification may optionally be sent to one or more users. For example, if a customer shares a case with an email notification, a connection owner in the partner's organization may receive the email. A partner owner may be one or more individuals/users that receive information on the connection between a first and second tenant. In another example, if a case is shared as a child of another record and the 'Send Notification Email' option is selected, then the notification may be sent to the 'Case Owner' in a subscriber's/user's organization. Optionally, the record owner of a first tenant may be provided a notification when a record is shared with a second tenant. When sharing a case, once the case is accepted, all 'Public' comments on the case at the first tenant may also be shared with the second tenant. 'Public' comments may be provided for the various methods of sharing cases (e.g. manual, automated, queue assignment). For example, case forwarding/stop sharing may be managed with the API (e.g. using a PartnerNetworkRecordConnection table).

Forward Cases as Child of Another Record (e.g. Account, Contact, Product and any other Object where the Case is a Related List)

Cases may be forwarded with a related list and/or in accordance with a hierarchical relationship. Although examples are provided of forwarding with a related list and hierarchical relationship, those skilled in the art will recognize other relationships that may allow for forwarding of cases. Users may indicate relationships/hierarchical relationships/connections with the use of a user interface. For example, if a case is shared as a parent and if the subscriber has not selected the 'Auto-Accept' option, then the subscriber may accept the Case using the 'Cases from Connections' list view. This view may include, but is not limited to, the following fields: Connection Name, Sent Date, Subject, Case Number, Account Name, Contact Name, Priority, Case Status, Asset Name, Parent Record Name and/or Case Type. Continuing with the example, a Parent Record Name field may be set if the Case is shared as a child of another record and is populated with the name of the parent record including type of object (e.g. Account: Acme). A customer may create multiple object views using the fields above and assign the same views to multiple internal users using a role assignment.

In another example, case reports may be created. Using such reports customers may view which cases have been shared and updated by a connection. Case History and Case reports may have an additional section for Connections (e.g. 'Connection' and 'Connection History' tables). Validation rules may be utilized for sharing between connections. For example, a Customer can use Received Connection Name/ID along with "Current User Alias contains pnet" to ignore validation rules (e.g. when the case is shared with a connection (same as other objects)). Optionally, a customer can use Received Connection Name and "Current User contains pnet" to run workflow rules (e.g. rules that are the same with other objects). List views may be created. For example, Received Connection Name and Sent Connection Name are available to create filter list views to show all cases shared with one or more connections. Assignment rules may be used to determine case receipt. For example, when a case is assigned to a queue where the connection is a member, then that connection may receive the case. Escalation rules may be applied to determine how cases are shared. For example, when a case is inserted/updated and is assigned to a queue where a connection is a member, then the connection should receive the case. The API may provide the ability for customers to run triggers on cases using database tables (e.g. PartnerNetworkConnection and PartnerNetworkRecordConnection tables).

Comments

Comments may be associated/related/connected to a case and shared accordingly. For example, comments may be shared if designated a child of a case. Comments may be considered Public (e.g. available to both internal and external users) and Private (e.g. only available to internal users). Comments may have publish and subscribe fields, and may optionally use templates. General Forward/Stop Sharing rules may be created and applied with comments. In an example, when the case is shared, only public comments are forwarded if the Comments object is subscribed by the target connection. If a 'Private' or new comment on a shared case is marked 'Public', then the comment may automatically be shared with all the connections on the parent case if the connections have subscribed to the Comments object.

A stop may be placed on sharing comments. If a comment has already been shared then the ways to 'stop sharing' may include, but are not limited to, the following steps: (a) If sharing is terminated on the case with a specific connection, then an implementation may stop sharing any comments on the case with that specific connection. This stop may not impact sharing with other active connections on the case. (b) cases and/or comments object that are not published/subscribed to may automatically terminate sharing on the comments (c) if a comment that is shared is marked 'Private', then sharing may be terminated with all the connections automatically. Public comments may be forwarded with cases if Comments have been published/subscribed with the connection.

Cases with Comments reports may be modified to include 'Connection Histories' and 'Connections' table. Workflow rules may be used to determine sharing of comments.

Notes & Attachments

Notes and Attachments may be shared between tenants in a multi-tenant database system. Notes & Attachments may be shared as a 'child' of other supported objects including, but not limited to, the following: Leads, Opportunities, Accounts, Contacts, Products, Cases and Custom Objects. Optionally, an application programming interface (API) and/or user interface may include, but is not limited, publish fields, subscribe fields, templates, publish object/field selection, case history, indication of connections, a case number field (e.g. a field generated when the case is created), and/or a forwarding field. Public Notes and Attachments may be shared with connections with a parent record if the connection has subscribed to Notes and Attachments. User interfaces may have checkbox fields for attachments, such as a 'Share with Connections' checkbox. The attachment may be visible on edit and detail screen, visible if a parent record is shared, visible if attachment public and the user is associated with an organization for which the attachment is visible.

In an example, the steps to share Notes and Attachments include, but are not limited to, the following: (a) when an Attachment is created by default, it is Public (e.g. the Private option is unchecked), (b) the new attachment may not be shared even if the parent has been shared, (c) the user may edit the attachment and check the 'Share with Connections' option to enable sharing. In another example, in the target organization, the attachment will be marked 'Public' and 'Share with Connections'=true to enable sharing.

Notes may be created by default as Private (e.g. the Public option is unchecked) which means that if the parent has been shared with one or more connections, then the Notes may not be shared unless the note is made 'Public.' For a private Note/Attachment, if the 'Private' option is unchecked (e.g. now public), then the Note may automatically be shared if subscribed to by the connection (e.g. and parent is shared). In an example, if the 'Private' option is unchecked (e.g. now public) and the 'Share with Connections' option is checked, then the attachment may automatically be shared if subscribed to by the connection (and parent is shared). Sharing 'Public' Notes/Attachments may be designated via api or using queues. Child Public Notes/Attachments may be shared when sharing parent record. Public notes may automatically be inserted into target organization. Attachments may be shared if the 'Share with Connections' checkbox is marked 'true' on all 'Public' attachments.

Steps to stop sharing Notes/Attachments may include, but are not limited to, the following: (a) if the 'Private' option is selected, then sharing must be terminated automatically with all connections. The 'Share with Connections' checkbox may be set to 'false' when the Attachment is marked private, (b) if the 'Share with Connections' checkbox is unchecked on a Public (shared) attachment, then sharing may be terminated immediately with the target organization. If the 'Public' option is unchecked for notes, then sharing may be terminated automatically with all connections. If the Note/Attachment is deleted, then sharing may be terminated automatically with all connections. For custom objects, if the 'Note and Attachment' option is not selected on the subscribing organization, then the Public Note/Attachment may not be shared. If sharing on the parent record is terminated either with one or more connections, then sharing on the Note/Attachment may also be terminated. If a Note/Attachment is Unpublished and Unsubscribed, then sharing may be terminated automatically.

System Overview

Figure 6:
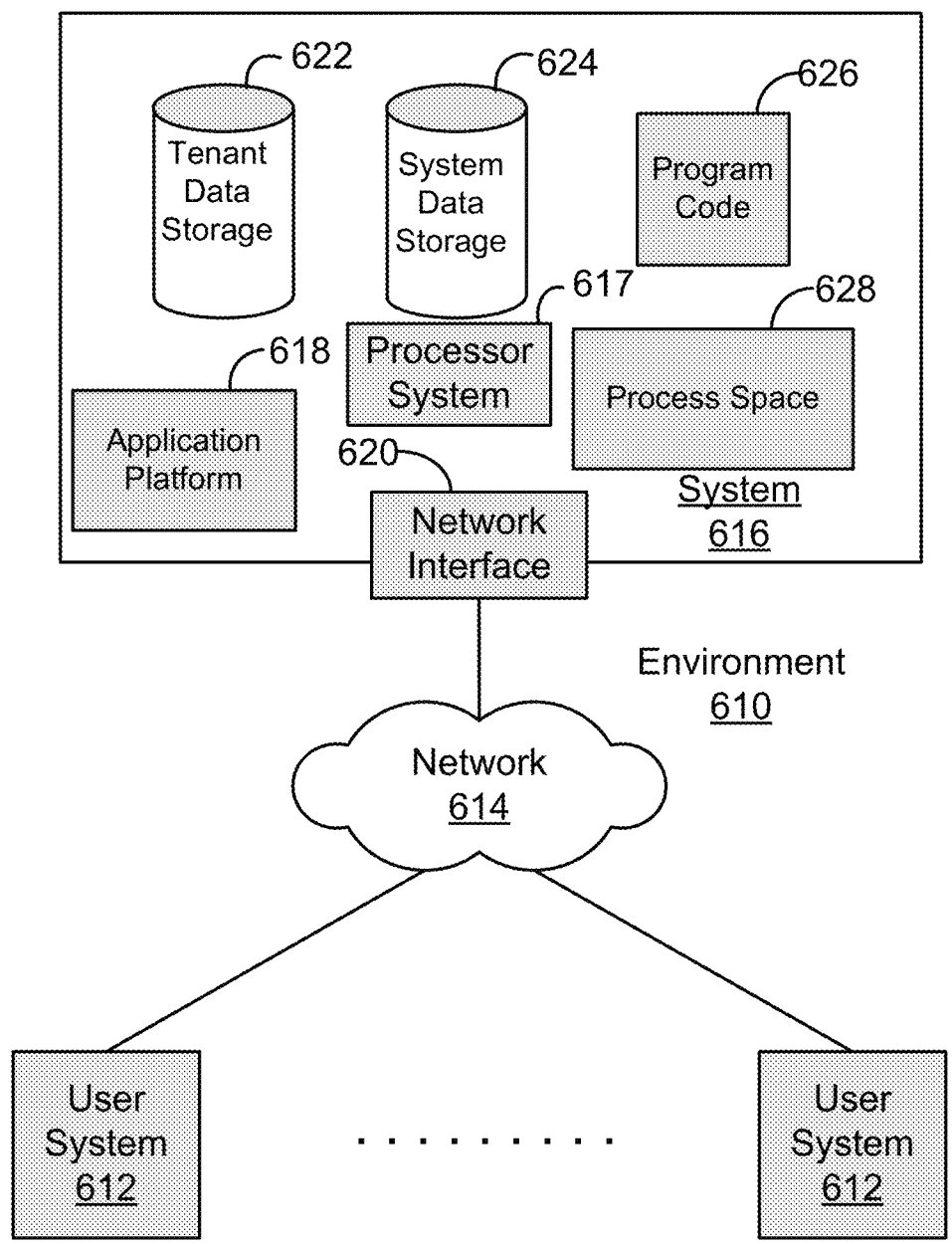
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 18, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
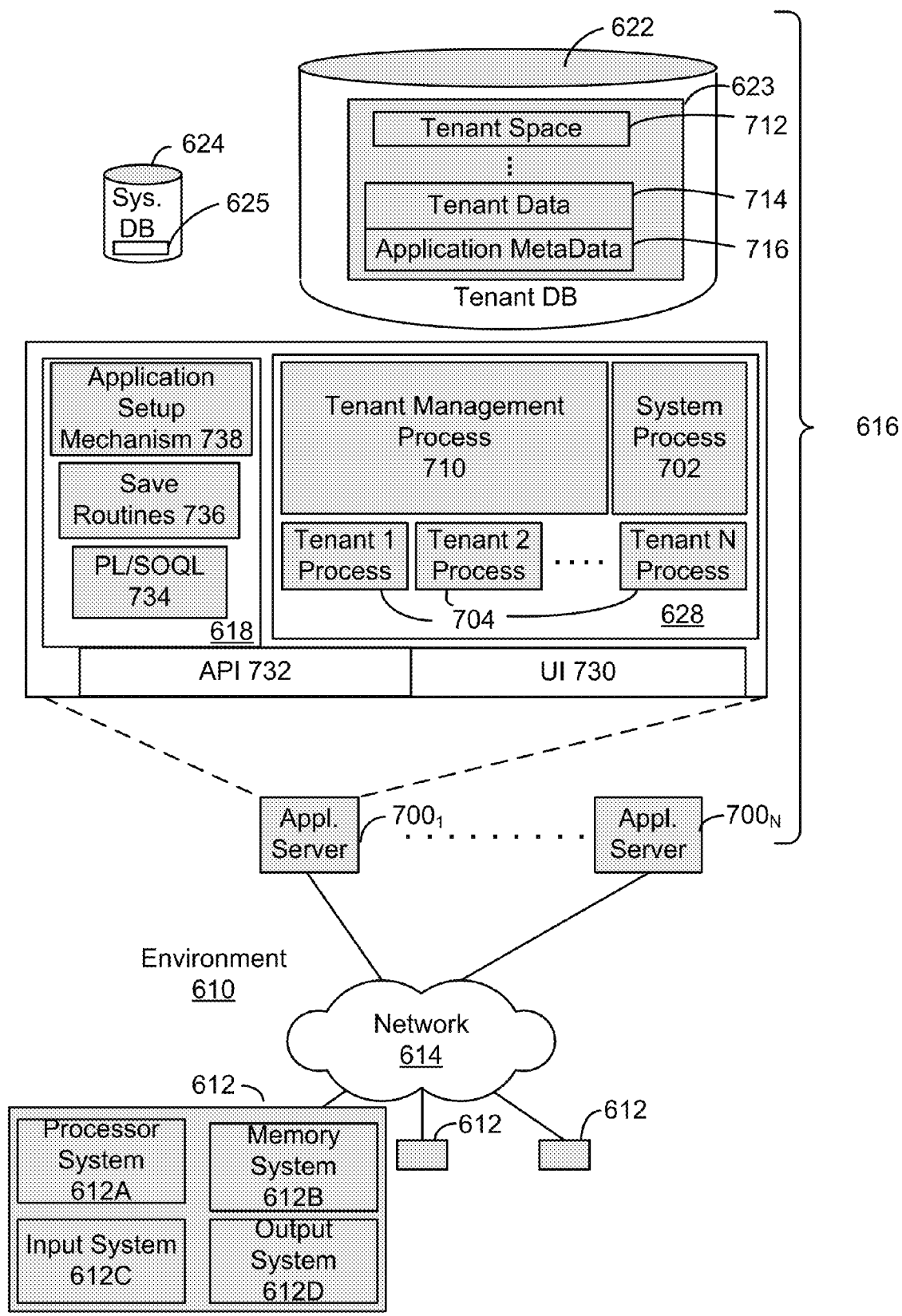
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

We claim:

1. A method of sharing information between tenants in a multi-tenant database, the method comprising:
    performing by one or more processors:
        establishing connection information between a first tenant of a multi-tenant database and a second tenant, wherein the connection information comprises information defining a scope of data from the first tenant that is shared with the second tenant;
        managing access of data of a record of the first tenant by the second tenant in accordance with the connection information;
        receiving information on a file related to the record of the first tenant;
        managing access of data of the file by the second tenant in accordance with the connection information;
        receiving information on a related record that is related to the record of the first tenant; and
        sending a request to enter data from the related record in a database table of the second tenant in accordance with the connection information.

2. The method of claim 1, the method further comprising: receiving the data of the record of the first tenant; and retrieving the connection information upon entry of the data of the record of the first tenant in the multi-tenant database.

3. The method of claim 1, wherein the record comprises at least one of a case, a note, an attachment, and a comment.

4. The method of claim 1, the method further comprising: retrieving mapping information that maps one or more columns in a database table of the first tenant to one or more columns in a database table of the second tenant; creating a shared record for the second tenant using the mapping information; and sending a request to enter the shared record into the database table of the second tenant.

5. The method of claim 4, wherein the shared record comprises the data of the file.

6. The method of claim 1, wherein the related record is a parent record.

7. A computer-readable storage medium having one or more instructions thereon for sharing information between tenants in a multi-tenant database, the instructions when executed by one or more processors causing the one or more processors to carry out:
    establishing connection information between a first tenant of a multi-tenant database and a second tenant, wherein the connection information comprises information defining a scope of data from the first tenant that is shared with the second tenant;
    managing access of data of a record of the first by the second tenant in accordance with the connection information;
    receiving information on a file related to the record of the first tenant;
    managing access of data of the file by the second tenant in accordance with the connection information;
    receiving information on a related record that is related to the record of the first tenant; and
    sending a request to enter data from the related record in a database table of the second tenant in accordance with the connection information.

8. The computer-readable storage medium of claim 7, the instructions when executed by one or more processors causing the one or more processors to further carry out:
    receiving the data of the record of the first tenant; and
    retrieving the connection information upon entry of the data of the record of the first tenant in the multi-tenant database.

9. The computer-readable storage medium of claim 7, wherein the record comprises at least one of a case, a note, an attachment, and a comment.

10. The computer-readable storage medium of claim 7, the instructions when executed by one or more processors causing the one or more processors to further carry out:
    retrieving mapping information that maps one or more columns in a database table of the first tenant to one or more columns in a database table of the second tenant;
    creating a shared record for the second tenant using the mapping information; and
    sending a request to enter the shared record into the database table of the second tenant.

11. The computer-readable storage medium of claim 10, wherein the shared record comprises the data of the file.

12. The computer-readable storage medium of claim 7, wherein the related record is a parent record.

13. A system for optimizing a query in a database system, the system comprising:
    a processor; and
    one or more stored sequences of instructions which, when executed by the processor, cause the processor to carry out:
        establishing connection information between a first tenant of a multi-tenant database and a second tenant, wherein the connection information comprises information defining a scope of data from the first tenant that is shared with the second tenant;
        managing access of data of a record of the first tenant by the second tenant in accordance with the connection information;
        receiving information on a file related to the record of the first tenant;

managing access of data of the file by the second tenant in accordance with the connection information;

receiving information on a related record that is related to the record of the first tenant; and sending a request to enter data from the related record in a database table of the second tenant in accordance with the connection information.

14. The system of claim 13, the instructions when executed by the processor causing the processor to further carry out:

receiving the data of the record of the first tenant; and retrieving the connection information upon entry of the data of the record of the first tenant in the multi-tenant database.

15. The system of claim 13, wherein the record comprises at least one of a case, a note, an attachment, and a comment.

16. The system of claim 13, the instructions when executed by the processor causing the processor to further carry out:

retrieving mapping information that maps one or more columns in a database table of the first tenant to one or more columns in a database table of the second tenant;

creating a shared record for the second tenant using the mapping information; and sending a request to enter the shared record into the database table of the second tenant.

17. The system of claim 13, wherein the related record is a parent record.

* * * * *